(12) United States Patent
Tung (10) Patent No.: US 12,277,022 B2
(45) Date of Patent: Apr. 15, 2025

(54) METHOD FOR ADAPTIVELY ADJUSTING STATE TRANSITION TIME IN PERIPHERAL COMPONENT INTERCONNECT EXPRESS SYSTEM TO ENHANCE OVERALL PERFORMANCE, AND ASSOCIATED APPARATUS

(71) Applicant: MEDIATEK INC., Hsin-Chu (TW)

(72) Inventor: Sheng-Ya Tung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 167 days.

(21) Appl. No.: 18/096,545

(22) Filed: Jan. 12, 2023

(65) Prior Publication Data

US 2024/0241569 A1 Jul. 18, 2024

(51) Int. Cl.
G06F 1/32 (2019.01)
G06F 1/08 (2006.01)
G06F 1/3296 (2019.01)

(52) U.S. Cl.
CPC .............. *G06F 1/3296* (2013.01); *G06F 1/08* (2013.01)

(58) Field of Classification Search
CPC .................................. G06F 1/3296; G06F 1/08
See application file for complete search history.

(56) References Cited

U.S. PATENT DOCUMENTS

| | | | |
|---|---|---|---|
| 7,631,136 B2* | 12/2009 | Mao | G06F 13/423 370/352 |
| 2014/0082242 A1* | 3/2014 | Murphy | G06F 13/24 710/263 |
| 2014/0108697 A1 | 4/2014 | Wagh | |
| 2022/0318170 A1* | 10/2022 | Li | G06F 13/26 |
| 2022/0382696 A1* | 12/2022 | Jeon | G06F 13/4221 |

FOREIGN PATENT DOCUMENTS

| | | |
|---|---|---|
| CN | 108713197 A | 10/2018 |
| CN | 109857692 A | 6/2019 |
| CN | 115437983 A | 12/2022 |
| TW | 202246993 A | 12/2022 |

\* cited by examiner

*Primary Examiner* — Zahid Choudhury
(74) *Attorney, Agent, or Firm* — Winston Hsu (57) ABSTRACT

A method for adaptively adjusting state transition time in a Peripheral Component Interconnect (PCI) Express (PCIe) system and associated apparatus such as a root complex (RC) device and an endpoint device are provided. The method may include: toggling a clock request signal on a signal path coupled between the RC device and the endpoint device based on a request from the RC device or on a request from the endpoint device, wherein when the clock request signal toggles, the endpoint device transits from a first state to a second state; and toggling a reference clock signal from the RC device at a timing determined according to a training parameter among at least one predetermined parameter which is set dependent on at least one of the factors: a transition time, a restoration delay, a latency tolerance report (LTR) and a bias state, after the clock request signal toggles.

15 Claims, 9 Drawing Sheets

METHOD FOR ADAPTIVELY ADJUSTING STATE TRANSITION TIME IN PERIPHERAL COMPONENT INTERCONNECT EXPRESS SYSTEM TO ENHANCE OVERALL PERFORMANCE, AND ASSOCIATED APPARATUS

BACKGROUND

The present invention is related to link control, and more particularly, to a method for adaptively adjusting state transition time in a Peripheral Component Interconnect (PCI) Express (PCIe) system to enhance overall performance, and associated apparatus such as a PCIe host and a PCIe device.

According to the related art, inefficiency of state transition may be incurred if the PCIe device and/or the PCIe host only use the same pattern or fixed delay time to wait for one or more specific signals to achieve corresponding condition(s) such as clock validation, signal assertion, circuit ready time, etc. during some procedures such as some transition procedures, etc. Thus, a novel method and associated architecture are needed for solving the problem of the related art without introducing any side effect or in a way that is less likely to introduce a side effect.

SUMMARY

It is an objective of the present invention to provide a method for adaptively adjusting state transition time in a PCIe system (e.g., a PCIe electronic system) to enhance overall performance, and associated apparatus such as a PCIe host (e.g., a root complex (RC) device) and a PCIe device (e.g., an endpoint device), in order to solve the above-mentioned problem.

At least one embodiment of the present invention provides a method for adaptively adjusting state transition time in a PCIe system to enhance overall performance, where the PCIe system comprises a RC device and an endpoint device. For example, the method may comprise: toggling a clock request signal on a signal path coupled between the RC device and the endpoint device based on a request from the RC device or on a request from the endpoint device, wherein when the clock request signal toggles, the endpoint device transits from a first state to a second state; and toggling a reference clock signal from the RC device at a timing determined according to a training parameter among at least one predetermined parameter which is set dependent on at least one of the factors: a transition time, a restoration delay, a latency tolerance report (LTR) and a bias state, after the clock request signal toggles.

In addition to the method mentioned above, the present invention further provides the RC device that operates according to the method. For example, the RC device may comprise: a processing circuit, arranged to control operations of the RC device; and at least one interface circuit, coupled to the processing circuit, arranged to perform communications operations with the endpoint device for the RC device.

In addition to the method mentioned above, the present invention further provides the endpoint device that operates according to the method. For example, the endpoint device may comprise: a processing circuit, arranged to control operations of the endpoint device; and at least one interface circuit, coupled to the processing circuit, arranged to perform communications operations with the RC device for the endpoint device.

It is an advantage of the present invention that, through proper design, the present invention method, as well as the associated apparatus such as any device among the RC device and the endpoint device, can enhance the overall performance of the PCIe system. For example, the present invention method and the associated apparatus can optimize the state transition time in the PCIe system with aid of self-training. In addition, the present invention method and apparatus can solve the related art problem without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
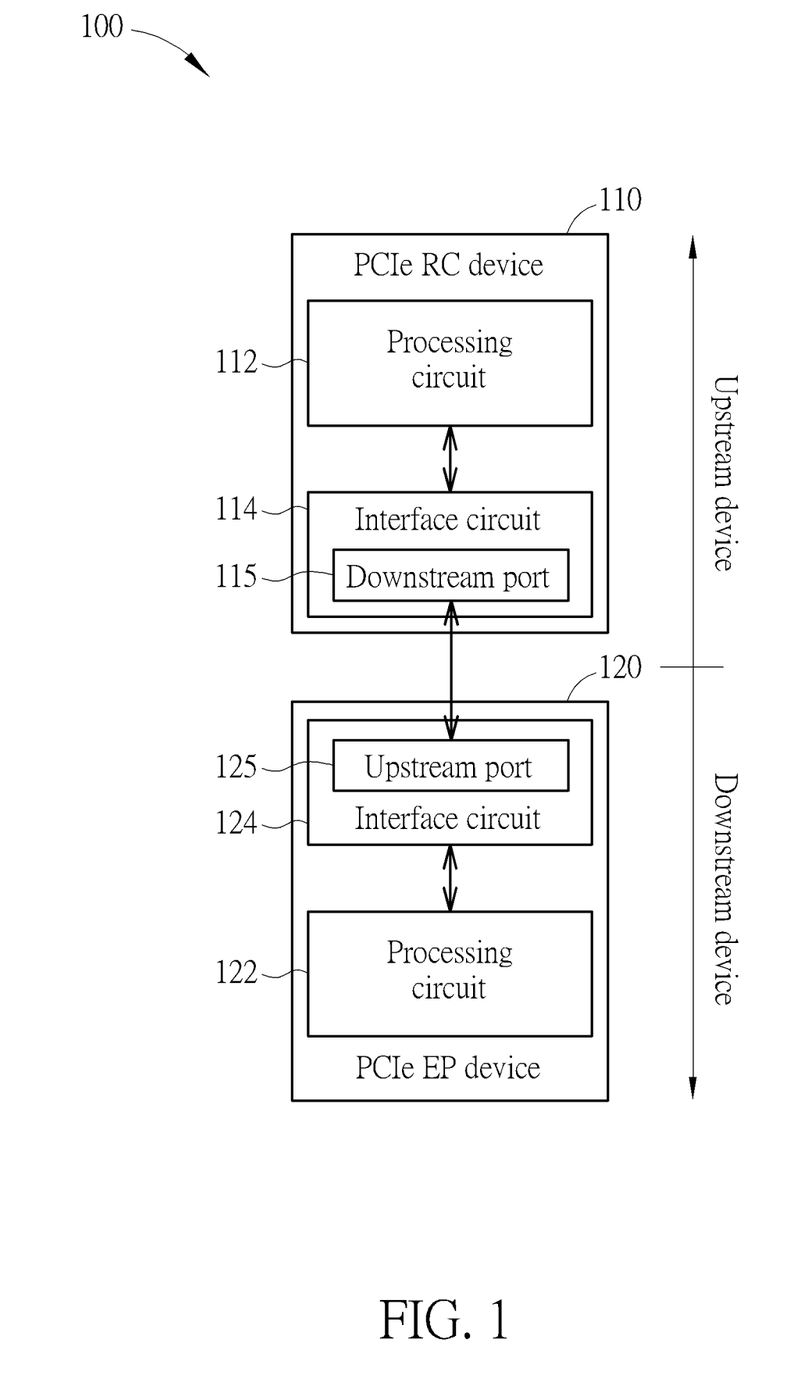
FIG. 1 is a diagram of a PCIe system according to an embodiment of the present invention.

FIG. 1 is a diagram of a PCIe system 100 according to an embodiment of the present invention. For better comprehension, the PCIe system 100 (e.g., any device therein) may be compatible or back-compatible to one or more versions of the PCIe specification, such as PCI Express Base Specification Revision 1.0 and PCI Express Base Specification Revision 2.0, but the present invention is not limited thereto. As shown in FIG. 1, the PCIe system 100 may comprise multiple devices, for example, a root complex (RC) device such as the PCIe RC device 110 and an endpoint (EP) device such as the PCIe EP device 120. The PCIe RC device 110 may comprise a processing circuit 112, and comprise at least one interface circuit (e.g., one or more interface circuits), which may be collectively referred to as the interface circuit 114, and the PCIe EP device 120 may comprise a processing circuit 122, and comprise at least one interface circuit (e.g., one or more interface circuits), which may be collectively referred to as the interface circuit 124. For example, the interface circuit 114 may comprise at least one downstream port (e.g., one or more downstream ports), which may be collectively referred to as the downstream port 115, and the interface circuit 124 may comprise an upstream port 125, where the PCIe RC device 110 equipped with the downstream port 115 may be regarded as an upstream device, and the PCIe EP device 120 equipped with the upstream port 125 may be regarded as a downstream device. Examples of the PCIe RC device 110 may include, but are not limited to: a workstation computer, a personal computer such as a desktop computer or a laptop computer, etc. Examples of the PCIe EP device 120 may include, but are not limited to: a graphics adapter, a data storage device such as a hard disk drive (HDD) or a solid state drive (SSD), etc.

In the architecture shown in FIG. 1, the processing circuit 112 may be arranged to control operations of the PCIe RC device 110, and the interface circuit 114 may be arranged to perform communications operations with the PCIe EP device 120 through the downstream port 115 for the PCIe RC device 110. In addition, the processing circuit 122 may be arranged to control operations of the PCIe EP device 120, and the interface circuit 124 may be arranged to perform communications operations with the PCIe RC device 110 through the upstream port 125 for the PCIe EP device 120.

Figure 2:
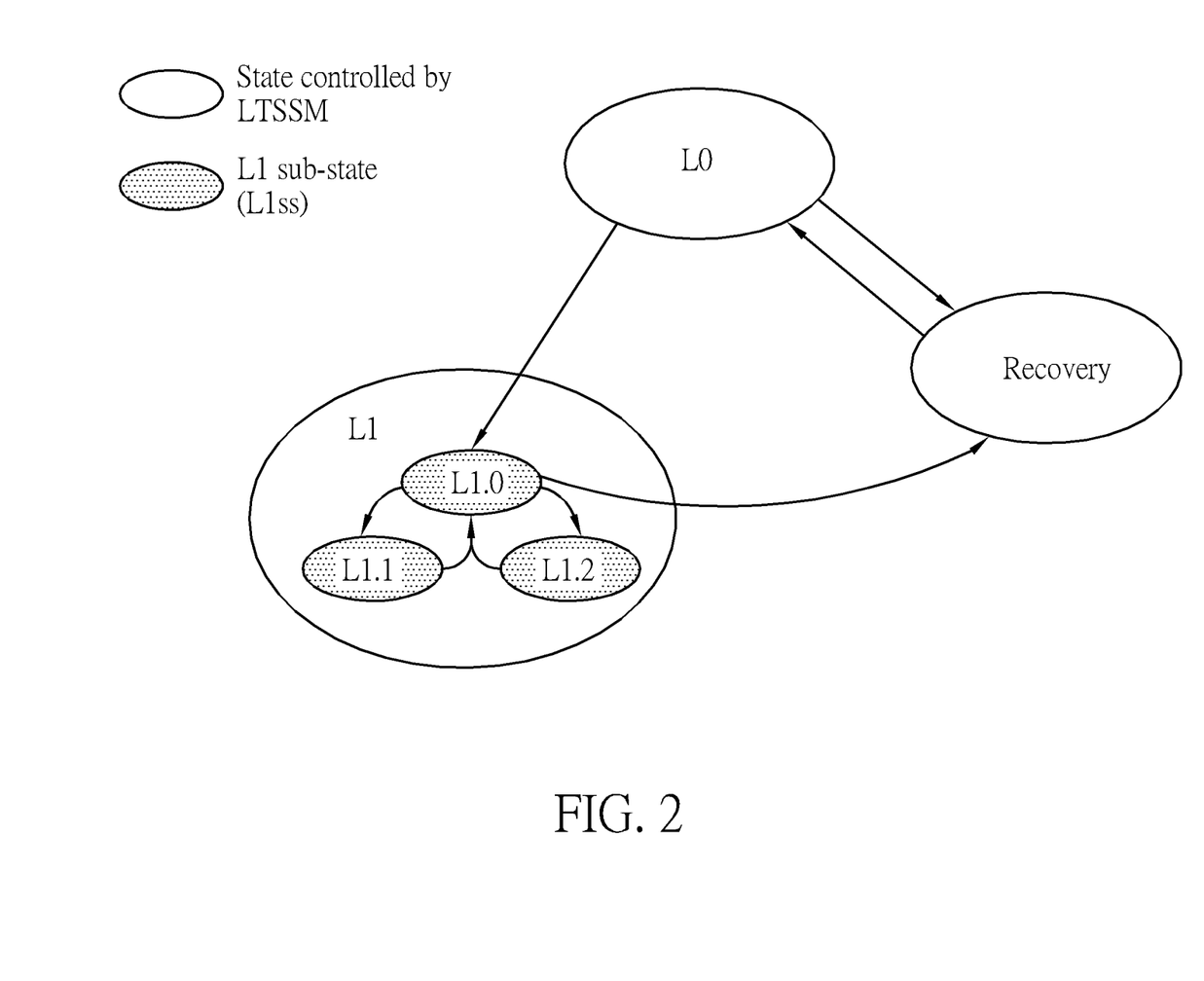
FIG. 2 is a diagram illustrating a state transition control scheme according to an embodiment of the present invention.

FIG. 2 is a diagram illustrating a state transition control scheme according to an embodiment of the present invention. In any device among the RC device and the EP device, such as the PCIe RC device 110 or the PCIe EP device 120, a link training and status state machine (LTSSM) may be used for link initialization and training process, to determine the associated information such as the link width, the link data rate, the bit lock, the symbol lock, etc. with aid of negotiation. The LTSSM may control this device (e.g., the aforementioned any device, such as the PCIe RC device 110 or the PCIe EP device 120) to stay in or switch among a plurality of top-level states such as Detect, Polling, Configuration, Recovery, L0, L0s, L1, L2, Hot Reset, Loopback and Disable. For better comprehension, some states (e.g., Recovery, L0 and L1) among the plurality of top-level states may be illustrated as shown in FIG. 2, where the other states among the plurality of top-level states may be temporarily omitted for brevity, but the present invention is not limited thereto. According to some embodiments, the other states among the plurality of top-level states may also be illustrated in the diagram to indicate more state transition related to the other states. As shown in FIG. 2, the L1 state may comprise multiple sub-states such as L1.0, L1.1 and L1.2, which may be referred to as the L1 sub-states (L1ss).

The aforementioned any device (e.g., the PCIe RC device 110 or the PCIe EP device 120) may operate normally to communicate with another device (e.g., the other device among the PCIe RC device 110 and the PCIe EP device 120) in a normal operation state such as the L0 state, and may perform power saving in a power saving state such as the L1 state. For example, this device (e.g., the aforementioned any device, such as the PCIe RC device 110 or the PCIe EP device 120) may switch from the L0 state to the L1 state (e.g., the L1.0 state among the L1ss thereof) directly in order to leave the L0 state and enter the L1 state (e.g., the L1.0 state), and may switch from the L1 state (e.g., the L1.0 state) to the L0 state through the Recovery state in order to leave the L1 state (e.g., the L1.0 state) and enter the L0 state. In addition, after entering the L1 state, this device (e.g., the aforementioned any device, such as the PCIe RC device 110 or the PCIe EP device 120) may switch from the L1.0 state to the L1.1 state in order to leave the L1.0 state and enter the L1.1 state, and switch back to the L1.0 state in order to leave the L1.1 state and enter the L1.0 state, and may switch from the L1.0 state to the L1.2 state in order to leave the L1.0 state and enter the L1.2 state, and switch back to the L1.0 state in order to leave the L1.2 state and enter the L1.0 state.

TABLE 1

| Sub-state | PLL | Rx/Tx | Common-mode voltage keepers |
|---|---|---|---|
| L1/L1.0 | On | On/Idle | On |
| L1.1 | Off | Off | On |
| L.1.2 | Off | Off | Off |

Table 1 illustrates an example of L1/L1ss power component comparison, but the present invention is not limited thereto. In the aforementioned any device (e.g., the PCIe RC device 110 or the PCIe EP device 120), the corresponding interface circuit (e.g., the interface circuit 114 or the interface circuit 124) may comprise at least one receiver (Rx) (e.g., one or more receivers) such as multiple receivers and at least one transmitter (Tx) (e.g., one or more transmitters) such as multiple transmitters, which may be positioned in the corresponding port (e.g., the downstream port 115 or the upstream port 125) of the corresponding interface circuit. In addition, an active-state power management (ASPM) mechanism of the LTSSM can be used to enter the power saving state such as a lower power state for PCIe links when the EP device such as the PCIe EP device 120 is not in use. For example, the L1.0 state and the L1.1 state among the L1ss may be used to further reduce power consumption by turning off multiple phase-locked loops (PLLs) along with their receivers and transmitters circuit power (e.g., the circuit power of the receivers and the transmitters) in the corresponding interface circuit (e.g., the interface circuit 114 or the interface circuit 124), while the L1.2 state may even allow turning off the common mode keeper circuits (e.g., the common-mode voltage keepers).

Figure 3:
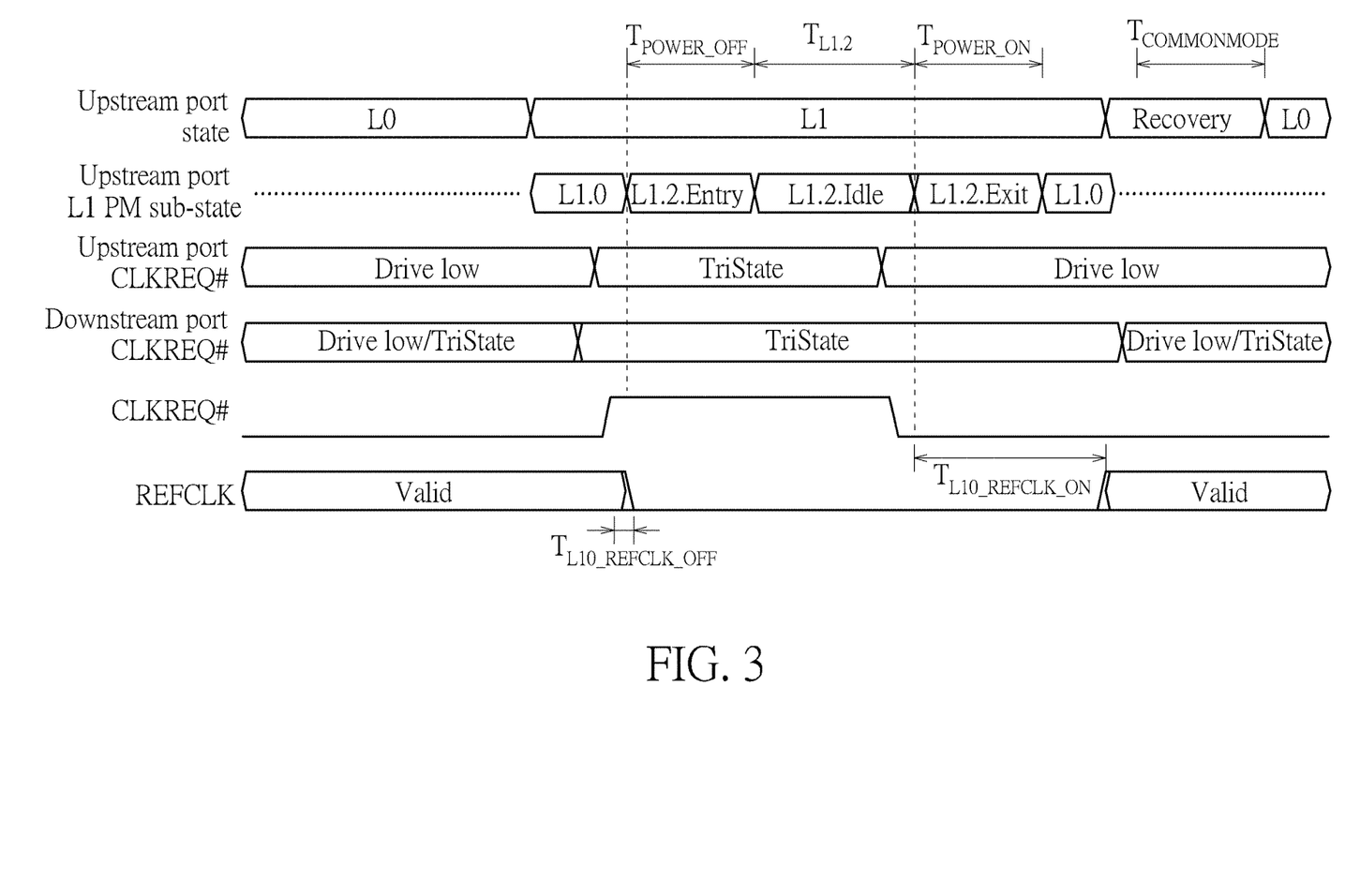
FIG. 3 is a diagram illustrating some signals involved with the state transition control scheme shown in FIG. 2.

FIG. 3 is a diagram illustrating some signals involved with the state transition control scheme shown in FIG. 2. For example, multiple signals may be transmitted on multiple signal paths coupled between the RC device and the EP device (e.g., the PCIe RC device 110 and the PCIe EP device 120), respectively, where the multiple signals may comprise a clock request signal CLKREQ such as the clock request signal CLKREQ #and a reference clock signal REFCLK as illustrated in FIG. 3. In addition, both of the RC device and the EP device (e.g., the PCIe RC device 110 and the PCIe EP device 120) are capable of controlling the clock request signal CLKREQ on a signal path among the multiple signal paths. As a result, when there is a need, the clock request signal CLKREQ may toggle between a non-request state (e.g., a high voltage level thereof) and a request state (e.g., a low voltage level thereof), and more particularly, transit from one state among the non-request state and the request state to the other state among the non-request state and the request state. Additionally, the RC device such as the PCIe RC device 110 may output the reference clock signal REFCLK on another signal path among the multiple signal paths from the RC device such as the PCIe RC device 110 into the EP device such as the PCIe EP device 120, and the EP device such as the PCIe EP device 120 may input the reference clock signal REFCLK on this signal path from the RC device such as the PCIe RC device 110 into the EP device such as the PCIe EP device 120. Under control of the RC device such as the PCIe RC device 110, the reference clock signal REFCLK may toggle between an invalid clock state (e.g., a low voltage level thereof) and a valid clock state (e.g., an oscillating state thereof), and more particularly, transit from one state among the invalid clock state and the valid clock state to the other state among the invalid clock state and the valid clock state, in order to correspond to the clock request signal CLKREQ. For example, in the invalid clock state, the reference clock signal REFCLK may carry no clock pulse. For another example, in the valid clock state, the reference clock signal REFCLK may carry clock pulses.

For better comprehension, the upstream port state, the upstream port L1 PM sub-state, the upstream port CLKREQ #, and the downstream port CLKREQ #as illustrated with FIG. 3 may be taken as examples of the state of the upstream port 125, the L1 power management (PM) sub-state of the upstream port 125, the level or state of the clock request signal CLKREQ #that the upstream port 125 is going to drive, and the level or state of the clock request signal CLKREQ #that the downstream port 115 is going to drive, respectively, where the L1.2 state may comprise multiple sub-states such as L1.2.Entry, L1.2.Idle and L1.2.Exit, and the upstream port 125 and the downstream port 115 may try driving the upstream port CLKREQ #and the downstream port CLKREQ #to be a low voltage level or a Tri-State logic signal (labeled "Drive low" and "TriState" for brevity), respectively, but the present invention is not limited thereto. According to some embodiments, the contents of the upstream port state, the upstream port L1 PM sub-state, the upstream port CLKREQ #, and the downstream port CLKREQ #as illustrated with FIG. 3 may vary.

The aforementioned any device (e.g., the PCIe RC device 110 or the PCIe EP device 120) may execute a state transition procedure for the EP device such as the PCIe EP device 120 to switch from a first state to a second state. For example, the state transition procedure may be a wake-up procedure, where the first state and the second state may represent the power saving state (e.g. the L1 state) and the normal operation state (e.g. the L0 state) of the EP device (e.g., the PCIe EP device 120), respectively. For another example, the state transition procedure may be a sleep procedure, where the first state and the second state may represent the normal operation state (e.g. the L0 state) and the power saving state (e.g. the L1 state) of the EP device (e.g., the PCIe EP device 120), respectively.

According to some embodiments, the architecture shown in FIG. 1 (e.g., the PCIe RC device 110 and the PCIe EP device 120) can adaptively adjust state transition time in the PCIe system 100 to enhance overall performance, and more particularly, can perform self-training on at least one predetermined parameter (e.g., one or more parameters) to optimize state transition in the PCIe system 100. For example, the aforementioned at least one predetermined parameter may comprise a reference clock on time parameter $T_{L10\_REFCLK\_ON}$, a reference clock off time parameter $T_{L10\_REFCLK\_OFF}$, a power on time parameter $T_{POWER\_ON}$, a power off time parameter $T_{POWER\_OFF}$, a common-mode restoration time parameter $T_{COMMONMODE}$, and an L1.2 state time parameter $T_{L1.2}$ as shown in FIG. 3, where the common-mode restoration time parameter $T_{COMMONMODE}$ may indicate the time for the RC device such as the PCIe RC device 110 to restore common-mode establishment (e.g., the establishment of the common-mode voltage on the transmitter(s)), but the present invention is not limited thereto. According to some embodiments, the aforementioned at least one predetermined parameter may vary. For example, the aforementioned at least one predetermined parameter may further comprise some other parameters such as a peer-side common-mode restoration waiting time parameter $T_{CM\_RXDELAY}$, where the peer-side common-mode restoration waiting time parameter $T_{CM\_RXDELAY}$ may indicate the wait time of waiting for the RC device such as the PCIe RC device 110 to restore the common-mode establishment mentioned above.

Figure 4:
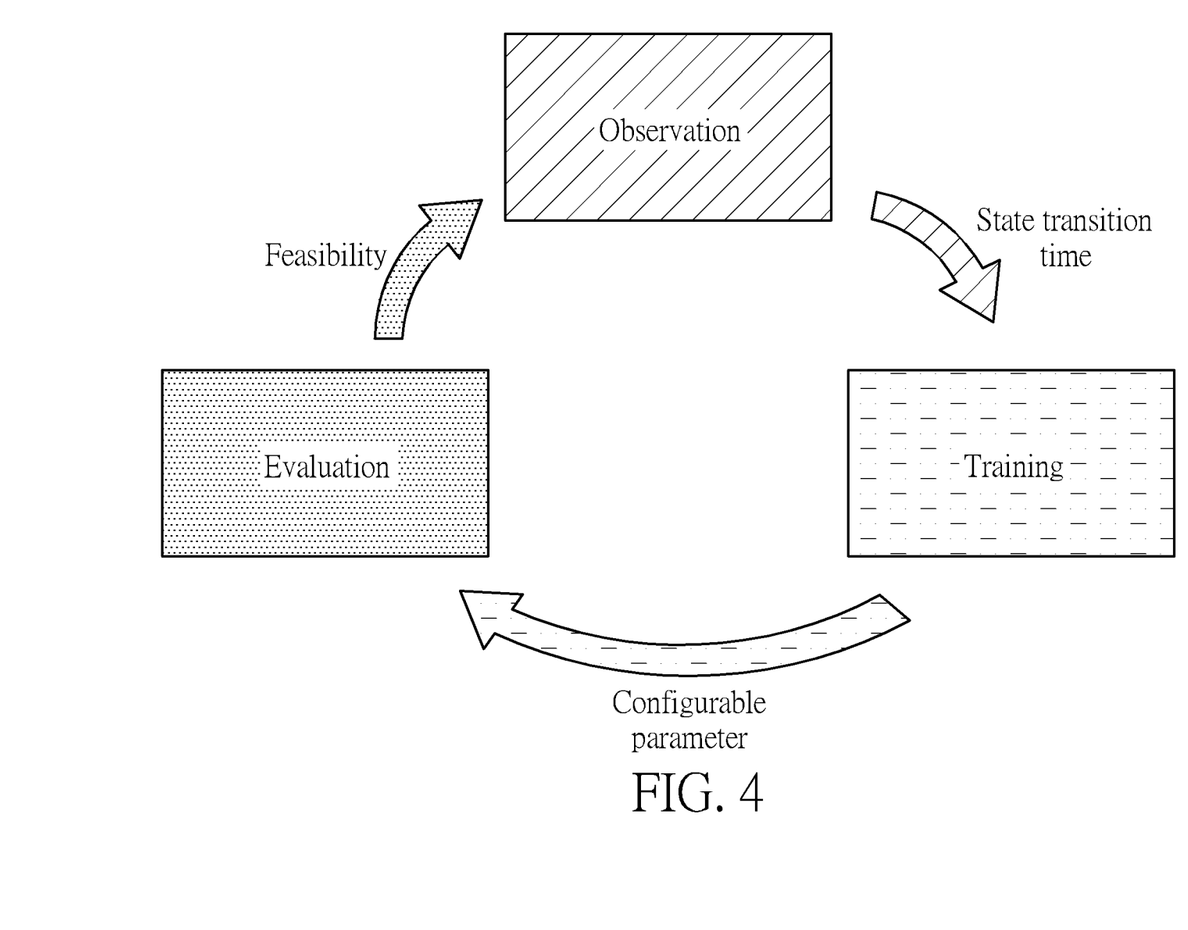
FIG. 4 is a diagram illustrating a self-training control scheme of a method for adaptively adjusting state transition time in a PCIe system to enhance overall performance according to an embodiment of the present invention.

FIG. 4 is a diagram illustrating a self-training control scheme of a method for adaptively adjusting state transition time in a PCIe system such as the PCIe system 100 shown in FIG. 1 to enhance overall performance according to an embodiment of the present invention. The architecture shown in FIG. 1 (e.g., the PCIe RC device 110 and the PCIe EP device 120) can perform the self-training on the aforementioned at least one predetermined parameter according to a self-training method (e.g., the self-training method $M^{Self}$ comprising a plurality of processing stages as shown in FIG. 4), to optimize the state transition procedure (e.g., the PCIe state transition procedure) in the PCIe system 100. For example, the plurality of processing stages of the self-training method may comprise an observation stage, a training stage and an evaluation stage (respectively labeled "Observation", "Training" and "Evaluation" for brevity). The aforementioned any device (e.g., the PCIe RC device 110 or the PCIe EP device 120) may monitor state transition time in the observation stage, adjust the values of multiple configurable parameters according to the latest value of the state transition time in the training stage, to generate the latest values of the multiple configurable parameters for being used in the evaluation stage, and review the achieved result along with history data for judgment (e.g., the judgment of whether to further adjust the multiple configurable parameters) in the evaluation stage, in order to determine the feasibility, for determining whether a next iteration of the plurality of processing stages is needed. For example, the achieved result may comprise efficiency of state transition and correctness of data transmission.

For better comprehension, assume that one or more functions of the architecture shown in FIG. 1, as well as the associated features, may be temporarily disabled, where the PCIe RC device 110 and/or the PCIe EP device 120 may be arranged to only use the same pattern or fixed delay time to wait for one or more specific signals to achieve corresponding condition(s) such as clock validation, signal assertion, circuit ready time, etc. during some procedures such as some transition procedures, but the present invention is not limited thereto. When the PCIe RC device 110 and/or the PCIe EP device 120 exit from the L1ss such as the L1.0 state etc. to the L0 state, the reference clock signal REFCLK may be valid after the clock request signal CLKREQ #is asserted, and then the PCIe RC device 110 and/or the PCIe EP device 120 may power up necessary circuits separately. Since the time from REFCLK output (e.g., the beginning of the valid clock state of the reference clock signal REFCLK), common mode voltage restoration (e.g., the restoration of the common mode voltage), transmitter/receiver circuit power up (e.g., the beginning of the power-up of the transmitters and/or the receivers), etc. to other delay factors may vary in different PCIe-based electronic systems such as the PCIe system 100, the L1ss exit latency may be changed from platform to platform, and the state transition time cannot be optimized if a fixed delay time is used to wait for the one or more specific signals (e.g., the peer-side common-mode voltage, such as the common-mode voltage of a data signal from the transmitter(s) of the peer side) to be ready. Please note that the PCIe system 100 (e.g., the PCIe RC device 110 and the PCIe EP device 120) operating according to the method can prevent the related art problem, for example, by performing the self-training on the aforementioned at least one predetermined parameter to optimize the state transition procedure in the PCIe system 100.

Figure 5:
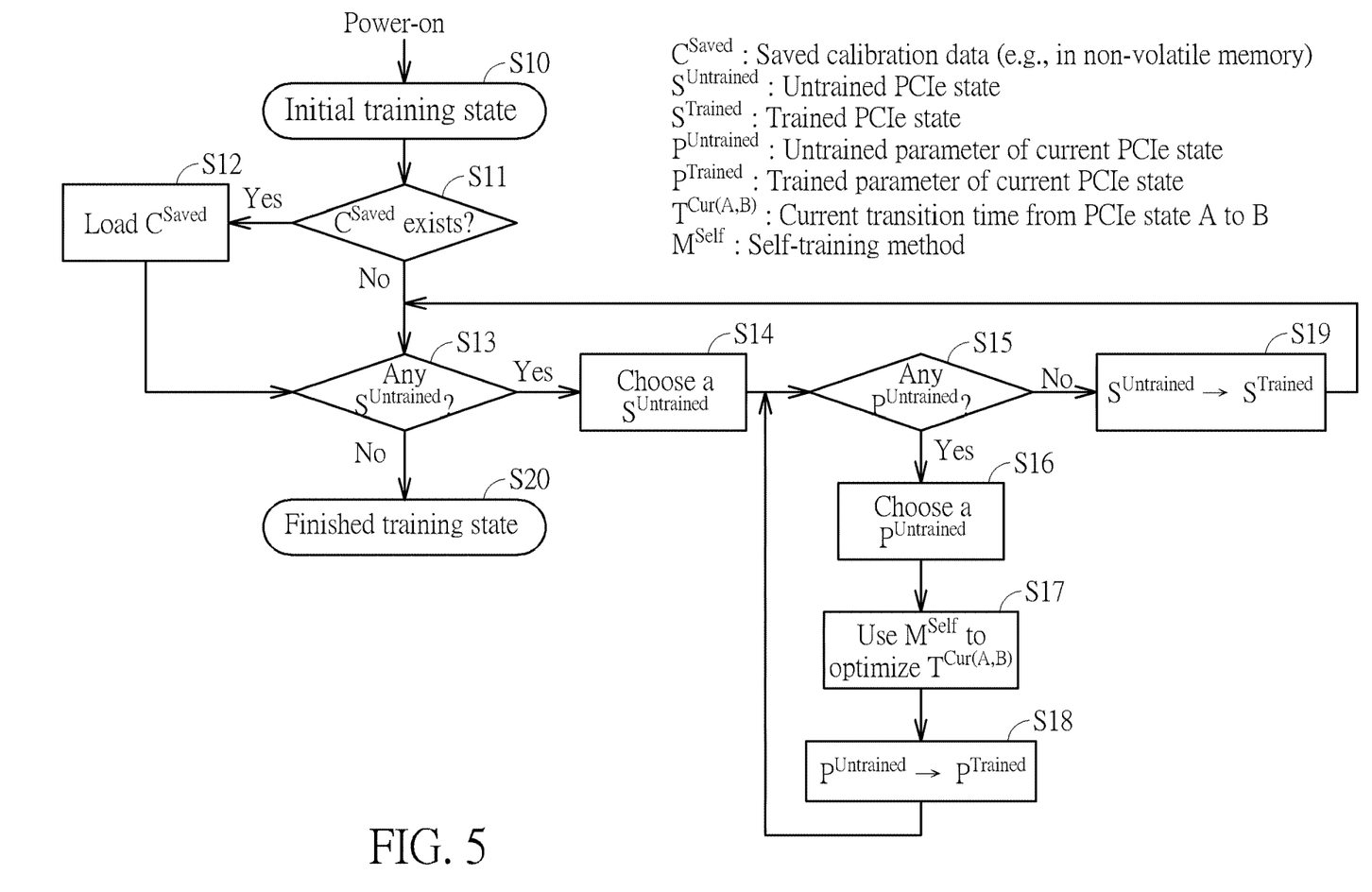
FIG. 5 is a diagram illustrating some implementation details of the self-training control scheme shown in FIG. 4 according to an embodiment of the present invention.

FIG. 5 is a diagram illustrating some implementation details of the self-training control scheme shown in FIG. 4 according to an embodiment of the present invention. The aforementioned any device (e.g., the PCIe RC device 110 or the PCIe EP device 120) that is arranged to perform the self-training may be referred to as the self-training device for brevity. The self-training device may perform the self-training on the aforementioned at least one predetermined parameter (e.g., the reference clock on time parameter $T_{L10\_REFCLK\_ON}$, the reference clock off time parameter $T_{L10\_REFCLK\_OFF}$, the power on time parameter $T_{POWER\_ON}$, the power off time parameter $T_{POWER\_OFF}$, the common-mode restoration time parameter $T_{COMMONMODE}$, the L1.2 state time parameter $T_{L1.2}$, and the peer-side common-mode restoration waiting time parameter $T_{CM\_RXDELAY}$) according to the aforementioned self-training method (e.g., the self-training method $M^{Self}$ comprising the plurality of processing stages as shown in FIG. 4) to generate calibration data, and save the calibration data into a non-volatile memory (e.g., a flash memory) within the self-training device to be the saved calibration data $C^{Saved}$, and more particularly, further update the saved calibration data $C^{Saved}$, in order to optimize the state transition procedure. In addition, the working flow shown in FIG. 5 may start from Step S10 and come to the end at Step S20, but the present invention is not limited thereto. According to some embodiments, the user of the PCIe system 100 may turn off the power of the PCIe system 100 in a situation where the self-training is not completed, and may turn off the power of the PCIe system 100 again to continue using the PCIe system 100, to allow the self-training to be completed.

In Step S10, after power-on of the PCIe system 100, the self-training device (e.g., the PCIe RC device 110 or the PCIe EP device 120) may start with an initial training state.

In Step S11, the self-training device (e.g., the PCIe RC device 110 or the PCIe EP device 120) may determine whether any saved calibration data $C^{Saved}$ exists. If Yes, Step S12 is entered; if No, Step S13 is entered.

In Step S12, the self-training device (e.g., the PCIe RC device 110 or the PCIe EP device 120) may load the saved calibration data $C^{Saved}$.

In Step S13, the self-training device (e.g., the PCIe RC device 110 or the PCIe EP device 120) may determine whether at least one untrained PCIe state $S^{Untrained}$ (e.g., one or more untrained PCIe states $\{S^{Untrained}\}$) exists. If Yes, Step S14 is entered; if No, Step S20 is entered.

In Step S14, in response to existence of the aforementioned at least one untrained PCIe state $S^{Untrained}$, the self-training device (e.g., the PCIe RC device 110 or the PCIe EP device 120) may choose or select an untrained PCIe state $S^{Untrained}$ among the aforementioned at least one untrained PCIe state $S^{Untrained}$, such as any untrained PCIe state $S^{Untrained}$ that has not been processed with the loop comprising Steps S15-S18 since the latest power-on of the PCIe system 100, to be a current PCIe state.

In Step S15, the self-training device (e.g., the PCIe RC device 110 or the PCIe EP device 120) may determine whether at least one untrained parameter $P^{Untrained}$ of the current PCIe state among the aforementioned at least one predetermined parameter exists, where the current PCIe state is selected from the aforementioned at least one untrained PCIe state $S^{Untrained}$.

In Step S16, in response to existence of the aforementioned at least one untrained parameter $P^{Untrained}$, the self-training device (e.g., the PCIe RC device 110 or the PCIe EP device 120) may choose or select a current untrained parameter $P^{Untrained}$ from the aforementioned at least one untrained parameter $P^{Untrained}$.

In Step S17, the self-training device (e.g., the PCIe RC device 110 or the PCIe EP device 120) may perform at least one training operation (e.g., one or more training operations) on the current untrained parameter $P^{Untrained}$ according to the self-training method $M^{Self}$ to optimize a current transition time $T^{Cur(A,B)}$ from an original state such as the PCIe state A to a target state such as the PCIe state B among a plurality of states of the self-training device (labeled "Use $M^{Self}$ to optimize $T^{Cur(A,B)}$" for brevity). For example, the first state and the second state mentioned above may be selected as the original state and the target state during executing the state transition procedure, respectively.

In Step S18, after performing the aforementioned at least one training operation on the current untrained parameter $P^{Untrained}$, the self-training device (e.g., the PCIe RC device 110 or the PCIe EP device 120) may classify the current untrained parameter $P^{Untrained}$ to be a trained parameter $P^{Trained}$ of the current PCIe state.

In Step S19, the self-training device (e.g., the PCIe RC device 110 or the PCIe EP device 120) may classify the untrained PCIe state $S^{Untrained}$ (e.g., the latest that has been chosen or selected in Step S14) to be a trained PCIe state $S^{Trained}$.

In Step S20, after completing the training operation(s) since the latest power-on of the PCIe system 100, the self-training device (e.g., the PCIe RC device 110 or the PCIe EP device 120) may achieve a finished training state.

For better comprehension, the method may be illustrated with the working flow shown in FIG. 5, but the present invention is not limited thereto. According to some embodiments, one or more steps may be added, deleted, or changed in the working flow shown in FIG. 5.

According to some embodiments, the aforementioned any device (e.g., the PCIe RC device 110 or the PCIe EP device 120) may execute the state transition procedure for the EP device such as the PCIe EP device 120 to switch from the first state to the second state for different times, where the state transition time may vary as a result of the self-training. For example, during executing the state transition procedure for the EP device such as the PCIe EP device 120 to switch from the first state to the second state for a first time, after a first time point T1 at which the clock request signal CLKREQ toggles between the non-request state (e.g., the high voltage level thereof) and the request state (e.g., the low voltage level thereof), the reference clock signal REFCLK may toggle between the invalid clock state (e.g., the low voltage level thereof) and the valid clock state (e.g., the oscillating state thereof) at a second time point T2, in order to correspond to the clock request signal CLKREQ. In addition, during executing the state transition procedure for the EP device such as the PCIe EP device 120 to switch from the first state to the second state for a second time, after a third time point T3 at which the clock request signal CLKREQ toggles between the non-request state (e.g., the high voltage level thereof) and the request state (e.g., the low voltage level thereof), the reference clock signal REFCLK may toggle between the invalid clock state (e.g., the low voltage level thereof) and the valid clock state (e.g., the oscillating state thereof) at a fourth time point T4, in order to correspond to the clock request signal CLKREQ, where a first time period P1(T1, T2) between the first time point T1 and the second time point T2 is different from a second time period P2(T3, T4) between the third time point T3 and the fourth time point T4.

When the self-training takes effect to achieve a better result, for example, the efficiency of state transition is increased (e.g., P1(T1, T2)>P2(T3, T4)) and the correctness of data transmission is maintained, the self-training device (e.g., the PCIe RC device 110 or the PCIe EP device 120) may discard at least one previous value of the aforementioned at least one predetermined parameter and start using the latest value of the aforementioned at least one predetermined parameter to control the associated operations, and more particularly, try to further improve the efficiency of state transition by performing more training operation(s). When no better result can be achieved, for example, any error occurs during data transmission, the self-training device (e.g., the PCIe RC device 110 or the PCIe EP device 120) may stop performing more training operation(s) and keep using the latest value of the aforementioned at least one predetermined parameter, such as the latest value corresponding to the better result or the best result, to control the associated operations. For brevity, similar descriptions for these embodiments are not repeated in detail here.

Figure 6:
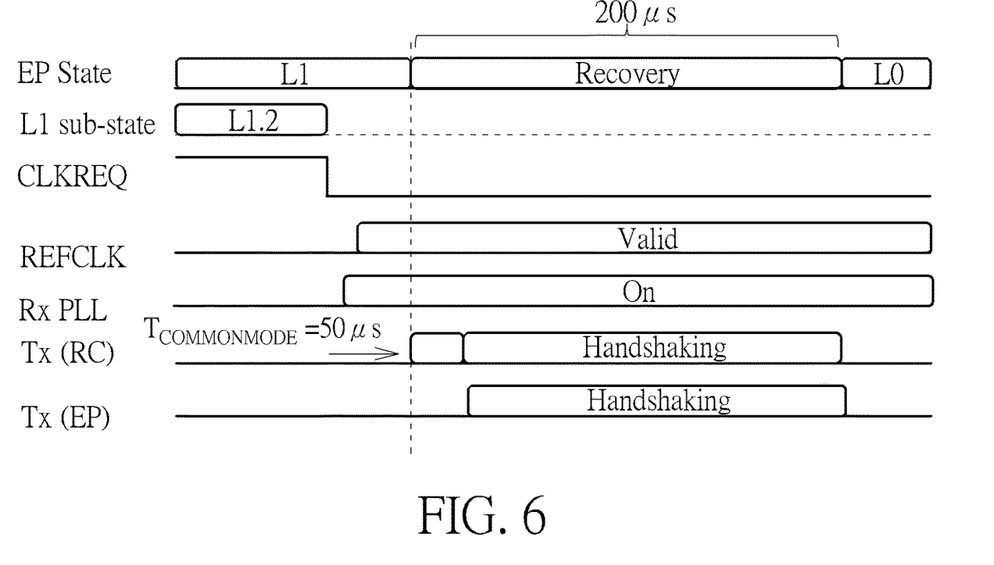
FIG. 6 is a diagram illustrating a first round of a first state transition control scheme of the method according to an embodiment of the present invention.
Figure 7:
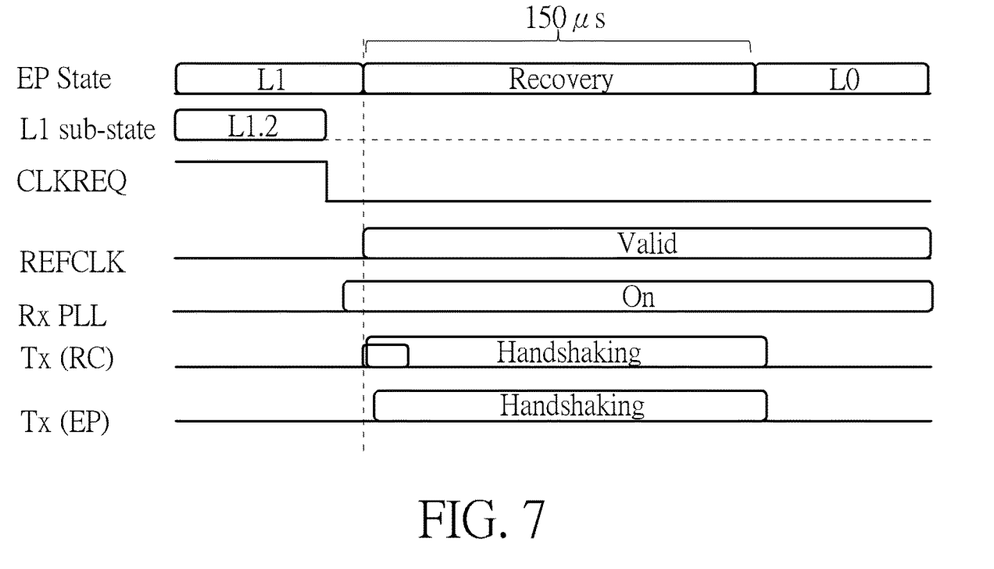
FIG. 7 is a diagram illustrating a second round of the first state transition control scheme of the method according to the embodiment shown in FIG. 6.

FIG. 6 and FIG. 7 illustrate a first round and a second round of a first state transition control scheme of the method according to an embodiment of the present invention, respectively, where the state of the PCIe EP device 120, the output signal of the PLL of the Rx corresponding to a certain lane in the upstream port 125 of the PCIe EP device 120, the data signal of the Tx corresponding to the same lane in the downstream port 115 of the PCIe RC device 110, and the data signal of the Tx corresponding to the same lane in the upstream port 125 of the PCIe EP device 120 (respectively labeled "EP state", "Rx PLL", "Tx (RC)" and "Tx (EP)" for brevity), etc. as illustrated in FIG. 6 and FIG. 7 may indicate the changes with respect to time in the first round and the second round, respectively, but the present invention is not limited thereto. In the first round with an initial setting (e.g., the initial setting regarding the common-mode restoration time parameter $T_{COMMONMODE}$) as shown in FIG. 6, the self-training device (e.g., the PCIe RC device 110) may select a first option (e.g., an option of waiting for bias stable and waiting for Tx drive) among multiple predetermined options regarding the common-mode restoration time parameter $T_{COMMONMODE}$ by default to set the common-mode restoration time parameter $T_{COMMONMODE}$ to be equal to 50 microseconds (μs). As a result, the time period corresponding to the Recovery state may be equal to 200 μs. In addition, in the second round with the self-training as shown in FIG. 7, the self-training device (e.g., the PCIe RC device 110) may select a second option (e.g., an option of only waiting for bias stable) among the multiple predetermined options regarding the common-mode restoration time parameter $T_{COMMONMODE}$ to set the common-mode restoration time parameter $T_{COMMONMODE}$ to be equal to zero (e.g., 0 μs), and more particularly, measure and monitor the state transition time during the self-training. As a result, the time period corresponding to the Recovery state may be equal to 150 μs, where the efficiency of state transition is increased (e.g., P1(T1, T2)>P2(T3, T4)).

TABLE 2A

| State machine | |
| --- | --- |
| PCIe state | Recovery → L0 |
| Trained parameter | $T_{COMMONMODE}$ |
| Measured transition time | 200 μs |

TABLE 2B

| | $T_{COMMONMODE}$ |
| --- | --- |
| Description | Restoration of REFCLK to restoration of common mode established through active transmission of handshaking |
| Option | 1. Wait bias stable + wait Tx drive (e.g., 50 μs, Default); and<br>2. Only wait bias stable. |

Table 2A illustrates an example of the measured transition time in the first round with the initial setting as shown in FIG. 6, and Table 2B illustrates an example of the associated information of the trained parameter (e.g., the common-mode restoration time parameter $T_{COMMONMODE}$) in the first state transition control scheme as shown in FIG. 6 and FIG. 7, where the multiple predetermined options regarding the common-mode restoration time parameter $T_{COMMONMODE}$ may comprise the first option such as the option of waiting for bias stable and waiting for Tx drive (labeled "Wait bias stable+wait Tx drive" for brevity) and the second option such as the option of only waiting for bias stable (labeled "Only wait bias stable" for brevity) in the first state transition control scheme. The self-training device (e.g., the PCIe RC device 110) may perform the self-training according to at least one self-training strategy (e.g., one or more self-training strategies), for example:

(1) the self-training device may compare the latest value of the measured transition time with the previous value of the measured transition time; and
(2) if the measured transition time can be reduced, the self-training device may keep selecting the second option; otherwise, the self-training device may fall back to the previous setting (e.g., the initial setting);

but the present invention is not limited thereto. For brevity, similar descriptions for this embodiment are not repeated in detail here.

Figure 8:
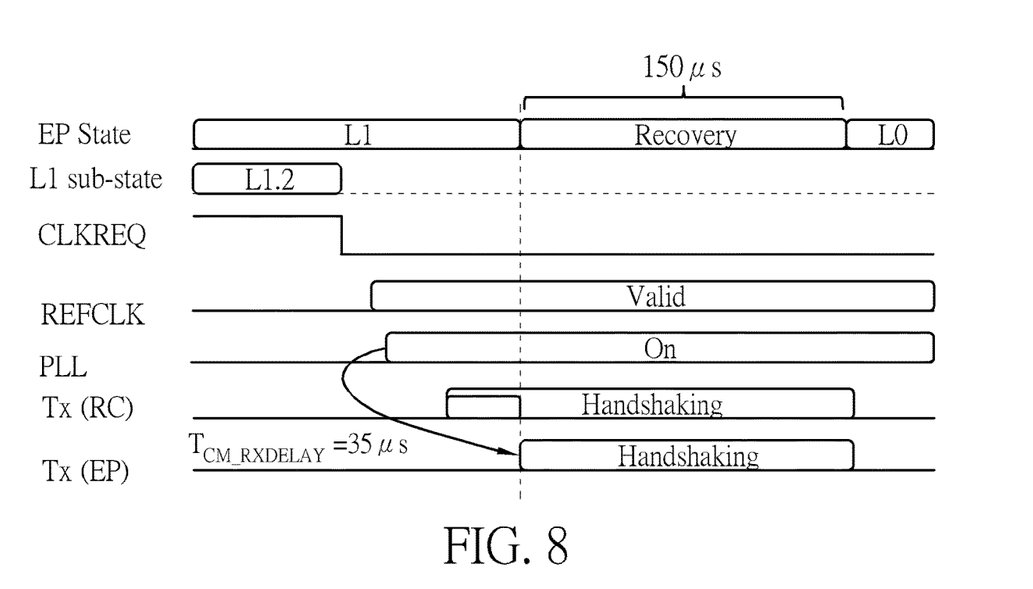
FIG. 8 is a diagram illustrating a first round of a second state transition control scheme of the method according to an embodiment of the present invention.
Figure 9:
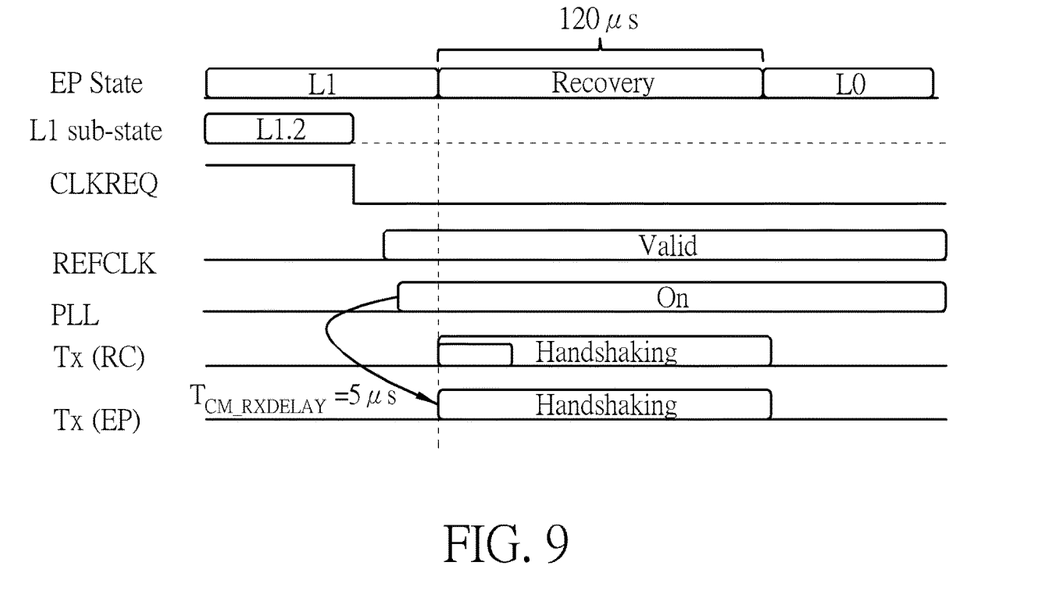
FIG. 9 is a diagram illustrating a second round of the second state transition control scheme of the method according to the embodiment shown in FIG. 8.

FIG. 8 and FIG. 9 illustrate a first round and a second round of a second state transition control scheme of the method according to an embodiment of the present invention, respectively, where the state of the PCIe EP device 120, the output signal of the PLL of the Rx corresponding to a certain lane in the upstream port 125 of the PCIe EP device 120, the data signal of the Tx corresponding to the same lane in the downstream port 115 of the PCIe RC device 110, and the data signal of the Tx corresponding to the same lane in the upstream port 125 of the PCIe EP device 120 (respectively labeled "EP state", "PLL", "Tx (RC)" and "Tx (EP)" for brevity), etc. as illustrated in FIG. 8 and FIG. 9 may indicate the changes with respect to time in the first round and the second round, respectively, but the present invention is not limited thereto. In the first round with an initial setting (e.g., the initial setting regarding the peer-side common-mode restoration waiting time parameter $T_{CM\_RXDELAY}$) as shown in FIG. 8, the self-training device (e.g., the PCIe EP device 120) may select a first option (e.g., an option of using a candidate value such as 35 μs) among multiple predetermined options (e.g., various options of using different candidate values such as integer values in the interval [5, 50] (μs), respectively) regarding the peer-side common-mode restoration waiting time parameter $T_{CM\_RXDELAY}$ by default to set the peer-side common-mode restoration waiting time parameter $T_{CM\_RXDELAY}$ to be equal to 35 μs. As a result, the time period corresponding to the Recovery state may be equal to 150 μs. In addition, in the second round with the self-training as shown in FIG. 9, the self-training device (e.g., the PCIe EP device 120) may select a second option (e.g., an option of using a candidate value such as 5 μs) among the multiple predetermined options regarding the peer-side common-mode restoration waiting time parameter $T_{CM\_RXDELAY}$ to set the peer-side common-mode restoration waiting time parameter $T_{CM\_RXDELAY}$ to be equal to 5 μs, and more particularly, measure and monitor the state transition time during the self-training, where the Tx (RC) ready time has been recorded, and the self-training device may try to reduce the peer-side common-mode restoration waiting time parameter $T_{CM\_RXDELAY}$ to the minimum such as 5 μs. As a result, the time period corresponding to the Recovery state may be equal to 120 μs, where the efficiency of state transition is increased (e.g., P1(T1, T2)>P2(T3, T4)).

TABLE 3A

| State machine | |
|---|---|
| PCIe state | Recovery → L0 |
| Trained parameter | $T_{CM\_RXDELAY}$ |
| Measured transition time | 150 μs |

TABLE 3B

| $T_{CM\_RXDELAY}$ | |
|---|---|
| Description | Wait time for peer to restore common mode establishment |
| Option | Range: from 5 μs to 50 μs (e.g., 35 μs, Default) |

Table 3A illustrates an example of the measured transition time in the first round with the initial setting as shown in FIG. 8, and Table 3B illustrates an example of the associated information of the trained parameter (e.g., the peer-side common-mode restoration waiting time parameter $T_{CM\_RXDELAY}$) in the second state transition control scheme as shown in FIG. 8 and FIG. 9, where the multiple predetermined options regarding the peer-side common-mode restoration waiting time parameter $T_{CM\_RXDELAY}$ may comprise the aforementioned various options of using different candidate values such as the integer values in the interval [5, 50] (μs) (labeled "Range: from 5 μs to 50 μs" for brevity) in the second state transition control scheme. The self-training device (e.g., the PCIe EP device 120) may perform the self-training according to at least one self-training strategy (e.g., one or more self-training strategies), for example:

(1) the self-training device may try the shortest delay value of the peer-side common-mode restoration waiting time parameter $T_{CM\_RXDELAY}$ first;

(2) if the measured transition time can be reduced, the self-training device may keep selecting the option of using the shortest delay value of the peer-side common-mode restoration waiting time parameter $T_{CM\_RXDELAY}$; otherwise, the self-training device may try a longer delay value of the peer-side common-mode restoration waiting time parameter $T_{CM\_RXDELAY}$, to determine whether the measured transition time can be improved or reduced, in order to achieve the best result available, and more particularly, increase the efficiency of state transition;

but the present invention is not limited thereto. For brevity, similar descriptions for this embodiment are not repeated in detail here.

Figure 10:
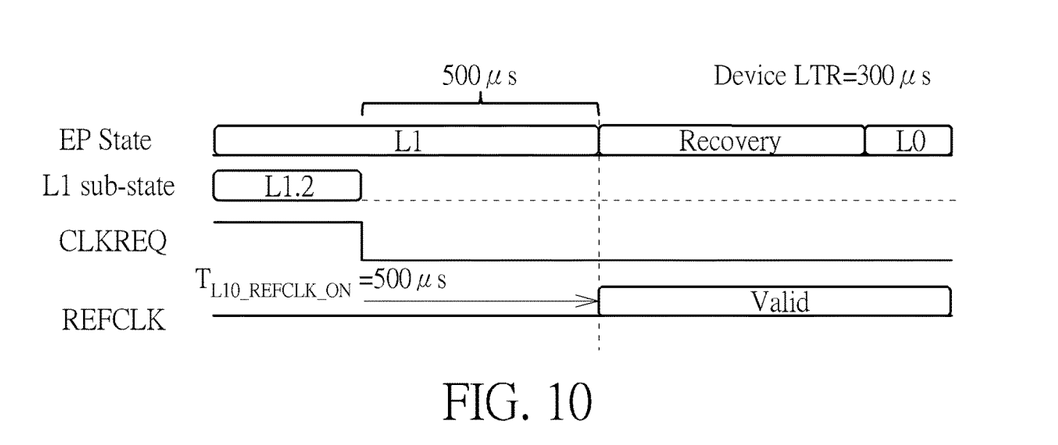
FIG. 10 is a diagram illustrating a first round of a third state transition control scheme of the method according to an embodiment of the present invention.
Figure 11:
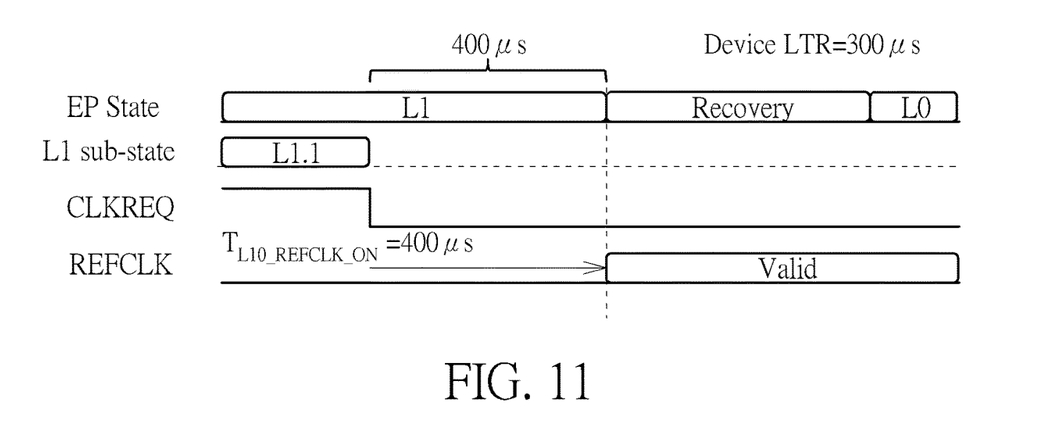
FIG. 11 is a diagram illustrating a second round of the third state transition control scheme of the method according to the embodiment shown in FIG. 10.
Figure 12:
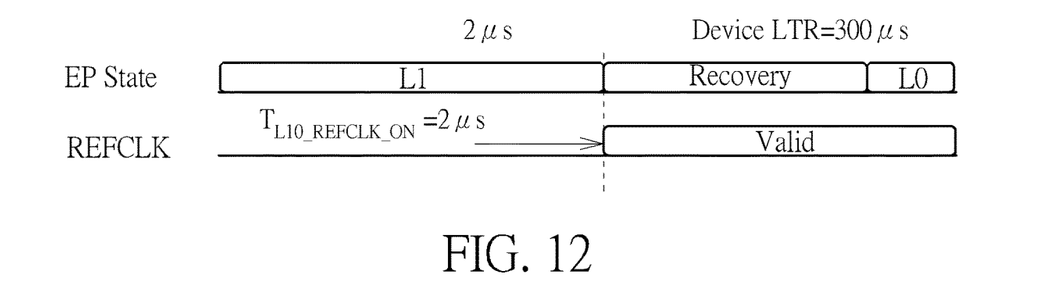
FIG. 12 is a diagram illustrating a third round of the third state transition control scheme of the method according to the embodiment shown in FIG. 10.

FIG. 10, FIG. 11 and FIG. 12 illustrate a first round, a second round and a third round of a third state transition control scheme of the method according to an embodiment of the present invention, respectively, where the state of the PCIe EP device 120 (labeled "EP state" for brevity), etc. as illustrated in FIG. 10, FIG. 11 and FIG. 12 may indicate the changes with respect to time in the first round, the second round and the third round, respectively, but the present invention is not limited thereto. In the first round with an initial setting (e.g., the initial setting regarding the reference clock on time parameter $T_{L10\_REFCLK\_ON}$) as shown in FIG. 10, the self-training device (e.g., the PCIe RC device 110) may select a first option (e.g., an option of using a candidate value such as 500 μs, corresponding to the L1.2 state) among multiple predetermined options (e.g., some options of using different candidate values corresponding to the L1.2 state, the L1.1 state and the L1.0 state, respectively) regarding the reference clock on time parameter $T_{L10\_REFCLK\_ON}$ by default to set the reference clock on time parameter $T_{L10\_REFCLK\_ON}$ to be equal to 500 μs. As a result, the L1.2 exit time cannot meet the device's latency requirement (e.g., the latency requirement of the PCIe EP device 120) due to long time of the reference clock on time parameter $T_{L10\_REFCLK\_ON}$, and the self-training device may try in the second round to use the L1.1 state for getting a shorter time of the reference clock on time parameter $T_{L10\_REFCLK\_ON}$. In addition, in the second round with the self-training as shown in FIG. 11, the self-training device (e.g., the PCIe RC device 110) may select a second option (e.g., an option of using a candidate value such as 400 μs, corresponding to the L1.1 state) among the multiple predetermined options regarding the reference clock on time parameter $T_{L10\_REFCLK\_ON}$ to set the reference clock on time parameter $T_{L10\_REFCLK\_ON}$ to be equal to 400 μs, and more particularly, measure and monitor the state transition time during the self-training. As a result, the L1.1 exit time still cannot meet the device's latency requirement, and the self-training device may try in the third round to use the L1.0 state (e.g., the reference clock signal REFCLK is always on). Additionally, in the third round with the self-training as shown in FIG. 12, the self-training device (e.g., the PCIe RC device 110) may select a third option (e.g., an option of using a candidate value such as 2 μs, corresponding to the L1.0 state) among the multiple predetermined options regarding the reference clock on time parameter $T_{L10\_REFCLK\_ON}$ to set the reference clock on time parameter $T_{L10\_REFCLK\_ON}$ to be equal to 2 μs, and more particularly, measure and monitor the state transition time during the self-training. As a result, the L1.0 exit time can meet the device's latency requirement.

TABLE 4A

State machine

| | |
|---|---|
| PCIe state | L0 → Recovery |
| Trained parameter | $T_{L10\_REFCLK\_ON}$ |
| Measured transition time | 500 μs |

TABLE 4B $T_{L10\_REFCLK\_ON}$

| | |
|---|---|
| Description | CLKREQ# assertion to REFCLK valid when exiting low power state (e.g., L1ss) |
| Option | 1. 500 μs (L1.2, Default);<br>2. 400 μs (L1.1, higher power consumption); and<br>3. 2 μs (L1.0, highest power consumption). |

Table 4A illustrates an example of the measured transition time in the first round with the initial setting as shown in FIG. 10, and Table 4B illustrates an example of the associated information of the trained parameter (e.g., the reference clock on time parameter $T_{L10\_REFCLK\_ON}$) in the third state transition control scheme as shown in FIG. 10, FIG. 11 and FIG. 12, where the multiple predetermined options regarding the reference clock on time parameter $T_{L10\_REFCLK\_ON}$ may comprise the first option such as the option of using the candidate value of 500 μs (labeled "500 μs" for brevity), the second option such as the option of using the candidate value of 400 μs (labeled "400 μs" for brevity), and the third option such as the option of using the candidate value of 2 μs (labeled "2 μs" for brevity) in the third state transition control scheme. The self-training device (e.g., the PCIe RC device 110) may obtain latency tolerance report/reporting (LTR) information from the peer device (e.g., the PCIe EP device 120). For example, the LTR information may indicate that the latency tolerance is equal to 300 μs at the PCIe EP device 120 (labeled "Device LTR=300 μs" in each of FIG. 10, FIG. 11 and FIG. 12 for better comprehension). As a result, the self-training device (e.g., the PCIe RC device 110) may refer to the LTR information to perform the associated judgment (e.g., deciding how long to wait before servicing the interrupt from the PCIe EP device 120) during the self-training. For brevity, similar descriptions for this embodiment are not repeated in detail here.

Figure 13:
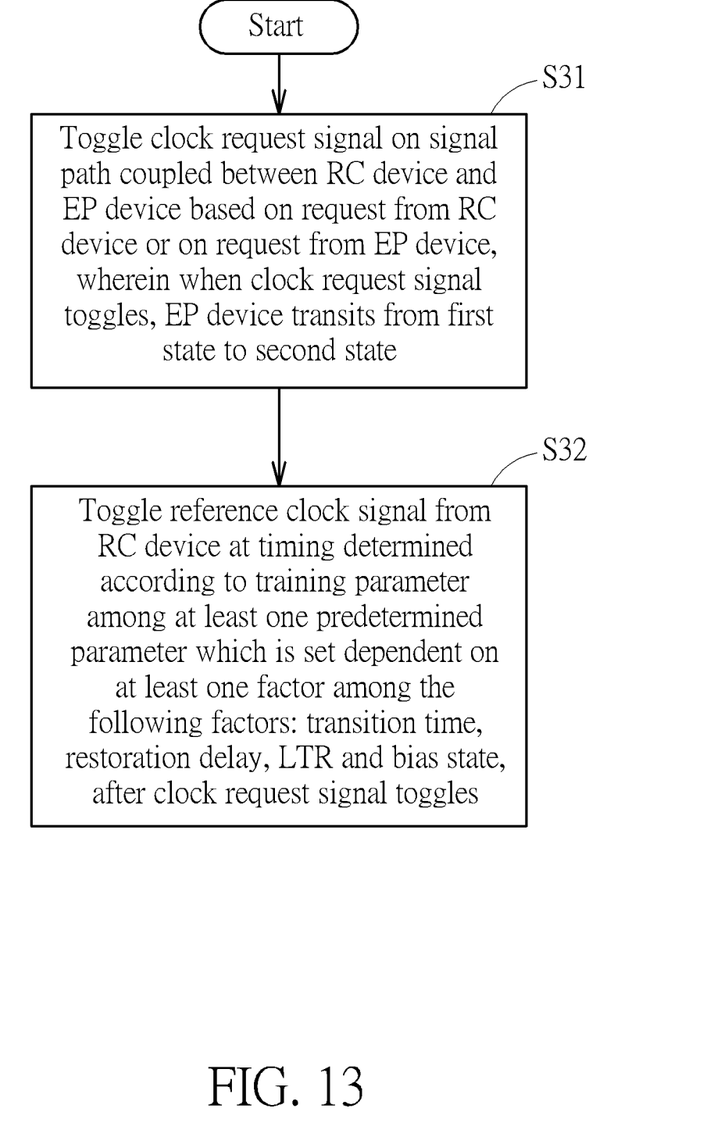
FIG. 13 illustrates a working flow of the method according to an embodiment of the present invention.

FIG. 13 illustrates a working flow of the method according to an embodiment of the present invention. For example, the method can be applied to the PCIe system 100, and more particularly, any device among the RC device and the EP device, such as the PCIe RC device 110. In addition, the PCIe system 100 (e.g., the self-training device, such as the PCIe RC device 110 or the PCIe EP device 120) may operate according to at least one control scheme (e.g., one or more control schemes) of the method, such as the self-training control scheme as shown in FIG. 4 and FIG. 5, the first state transition control scheme as shown in FIG. 6 and FIG. 7, the second state transition control scheme as shown in FIG. 8 and FIG. 9, and the third state transition control scheme as shown in FIG. 10, FIG. 11 and FIG. 12.

In Step S31, the PCIe system 100 (e.g., the self-training device, such as the PCIe RC device 110 or the PCIe EP device 120) may toggle the clock request signal CLKREQ on the corresponding signal path coupled between the RC device (e.g., the PCIe RC device 110) and the EP device (e.g., the PCIe EP device 120) based on a request from the RC device or on a request from the EP device, wherein when the clock request signal CLKREQ toggles, the EP device transits from the first state to the second state. For example, regarding the wake-up procedure, the first state and the second state may represent the power saving state (e.g. the L1 state) and the normal operation state (e.g. the L0 state) of the EP device (e.g., the PCIe EP device 120), respectively. For another example, regarding the sleep procedure, the first state and the second state may represent the normal operation state (e.g. the L0 state) and the power saving state (e.g. the L1 state) of the EP device (e.g., the PCIe EP device 120), respectively.

In Step S32, the PCIe system 100 (e.g., the PCIe RC device 110) may toggle the reference clock signal REFCLK from the RC device (e.g., the PCIe RC device 110) at a timing determined according to a training parameter among the aforementioned at least one predetermined parameter which is set dependent on at least one factor (e.g., one or more factors) among the following factors: a transition time, a restoration delay, a LTR and a bias state, after the clock request signal CLKREQ toggles. For example, the PCIe system 100 (e.g., the self-training device such as the PCIe RC device 110) may operate according to the third state transition control scheme as shown in FIG. 10, FIG. 11 and FIG. 12, and the aforementioned at least one factor may comprise the transition time (e.g., the state transition time of 500 μs in the first round shown in FIG. 10, the state transition time of 400 μs in the second round shown in FIG. 11, and the state transition time of 2 μs in the third round shown in FIG. 12) and the LTR (e.g., the device LTR of 300 μs at the PCIe device side such as the PCIe EP device 120). In some examples, the PCIe system 100 (e.g., the self-training device, such as the PCIe RC device 110 or the PCIe EP device 120) may operate according to the first state transition control scheme as shown in FIG. 6 and FIG. 7 and/or the second state transition control scheme as shown in FIG. 8 and FIG. 9, and the aforementioned at least one factor may comprise the restoration delay and the bias state.

During executing the state transition procedure for the EP device (e.g., the PCIe EP device 120) to switch from the first state to the second state for the first time, the RC device (e.g., the PCIe RC device 110) may output the reference clock signal REFCLK from the RC device (e.g., the PCIe RC device 110) into the EP device (e.g., the PCIe EP device 120), where after the first time point T1 at which the clock request signal CLKREQ toggles between the non-request state (e.g., the high voltage level thereof) and the request state (e.g., the low voltage level thereof), the reference clock signal REFCLK may toggle between the invalid clock state (e.g., the low voltage level thereof) and the valid clock state (e.g., the oscillating state thereof) at the second time point T2, in order to correspond to the clock request signal CLKREQ. In addition, during executing the state transition procedure for the EP device (e.g., the PCIe EP device 120) to switch from the first state to the second state for the second time, the RC device (e.g., the PCIe RC device 110) may output the reference clock signal REFCLK from the RC device (e.g., the PCIe RC device 110) into the EP device (e.g., the PCIe EP device 120), where after the third time point T3 at which the clock request signal CLKREQ toggles between the non-request state (e.g., the high voltage level thereof) and the request state (e.g., the low voltage level thereof), the reference clock signal REFCLK may toggle between the invalid clock state (e.g., the low voltage level thereof) and the valid clock state (e.g., the oscillating state thereof) at the fourth time point T4, in order to correspond to the clock request signal CLKREQ, and the first time period P1(T1, T2) between the first time point T1 and the second time point T2 is different from the second time period P2(T3, T4) between the third time point T3 and the fourth time point T4. For example, as a result of performing the self-training, the second time period P2(T3, T4) is less than the first time period P1(T1, T2), and therefore, the overall performance can be enhanced. For brevity, similar descriptions for this embodiment are not repeated in detail here.

For better comprehension, the method may be illustrated with the working flow shown in FIG. 13, but the present invention is not limited thereto. According to some embodiments, one or more steps may be added, deleted, or changed in the working flow shown in FIG. 13. For example, the state transition procedure may be the wake-up procedure, where the first state and the second state may represent the power saving state (e.g. the L1 state) and the normal operation state (e.g. the L0 state) of the EP device (e.g., the PCIe EP device 120), respectively, and in the wake-up procedure, the EP device may switch from the power saving state such as the L1 state to the normal operation state such as the L0 state through the Recovery state. During executing the wake-up procedure for the EP device to switch from the power saving state to the normal operation state for the first time, the clock request signal CLKREQ may switch from the non-request state to the request state at the first time point T1, and the reference clock signal REFCLK may switch from the invalid clock state to the valid clock state at the second time point T2, and more particularly, after the second time point T2 at which the reference clock signal REFCLK switches from the invalid clock state to the valid clock state, the RC device (e.g., the PCIe RC device 110) may start performing a first handshaking operation (e.g., the handshaking via the signal labeled "Tx (RC)" in the first round shown in FIG. 6, or the handshaking via the signal labeled "Tx (RC)" in the first round shown in FIG. 8) with the EP device (e.g., the PCIe EP device 120) at a first subsequent time point $T_{S1}$, to allow the EP device to enter the normal operation state after completion of the first handshaking operation. During executing the wake-up procedure for the EP device to switch from the power saving state to the normal operation state for the second time, the clock request signal CLKREQ may switch from the non-request state to the request state at the third time point T3, and the reference clock signal REFCLK may switch from the invalid clock state to the valid clock state at the fourth time point T4, and more particularly, after the fourth time point T4 at which the reference clock signal REFCLK switches from the invalid clock state to the valid clock state, the RC device (e.g., the PCIe RC device 110) may start performing a second handshaking operation (e.g., the handshaking via the signal labeled "Tx (RC)" in the second round shown in FIG. 7, or the handshaking via the signal labeled "Tx (RC)" in the second round shown in FIG. 9) with the EP device (e.g., the PCIe EP device 120) at a second subsequent time point $T_{S2}$, to allow the EP device to enter the normal operation state after completion of the second handshaking operation, where a third time period P3(T2, $T_{S1}$) between the second time point T2 and the first subsequent time point $T_{S1}$ is different from a fourth time period P4(T4, $T_{S2}$) between the fourth time point T4 and the second subsequent time point $T_{S2}$. Additionally, the self-training device such as the RC device (e.g., the PCIe RC device 110) may be arranged to adjust the common-mode restoration time parameter $T_{COMMONMODE}$ to make the third time period P3(T2, $T_{S1}$) and the fourth time period P4(T4, $T_{S2}$) be different from each other. For example, as a result of performing the self-training, the fourth time period P4(T4, $T_{S2}$) is less than the third time period P3(T2, $T_{S1}$), and therefore, the overall performance can be enhanced. For brevity, similar descriptions for these embodiments are not repeated in detail here.

According to some embodiments, for the self-training device such as the RC device (e.g., the PCIe RC device 110), the state transition procedure may be the sleep procedure, where the first state and the second state may represent the normal operation state (e.g. the L0 state) and the power saving state (e.g. the L1 state) of the EP device (e.g., the PCIe EP device 120), respectively, and in the sleep procedure, the EP device may switch from the normal operation state such as the L0 state to the power saving state such as the L1 state. During executing the sleep procedure for the EP device to switch from the normal operation state to the power saving state for the first time, the clock request signal CLKREQ may switch from the request state to the non-request state at the first time point T1, and the reference clock signal REFCLK may switch from the valid clock state to the invalid clock state at the second time point T2. During executing the sleep procedure for the EP device to switch from the normal operation state to the power saving state for the second time, the clock request signal CLKREQ may switch from the request state to the non-request state at the third time point T3, and the reference clock signal REFCLK may switch from the valid clock state to the invalid clock state at the fourth time point T4. For brevity, similar descriptions for these embodiments are not repeated in detail here.

According to some embodiments, at least one device among the RC device (e.g., the PCIe RC device 110) and the EP device (e.g., the PCIe EP device 120), such as the RC device (e.g., the PCIe RC device 110), may be arranged to adjust the aforementioned at least one predetermined parameter such as the reference clock on time parameter $T_{L10\_REFCLK\_ON}$, the reference clock off time parameter $T_{L10\_REFCLK\_OFF}$, etc. to at least make the first time period P1(T1, T2) and the second time period P2(T3, T4) be different from each other. For example, as a result of performing the self-training by the RC device (e.g., the PCIe RC device 110), the second time period P2(T3, T4) is less than the first time period P1(T1, T2) and the fourth time period P4(T4, $T_{S2}$) is less than the third time period P3(T2, $T_{S1}$), and therefore, the overall performance can be enhanced. For brevity, similar descriptions for these embodiments are not repeated in detail here.

According to some embodiments, during executing the wake-up procedure for the EP device to switch from the power saving state to the normal operation state for the first time, the clock request signal CLKREQ may switch from the non-request state to the request state at the first time point T1, and the reference clock signal REFCLK may switch from the invalid clock state to the valid clock state at the second time point T2, and more particularly, after the second time point T2 at which the reference clock signal REFCLK switches from the invalid clock state to the valid clock state, the EP device (e.g., the PCIe EP device 120) may start performing a first corresponding handshaking operation (e.g., the handshaking via the signal labeled "Tx (EP)" in the first round shown in FIG. 6, or the handshaking via the signal labeled "Tx (EP)" in the first round shown in FIG. 8) with the RC device (e.g., the PCIe RC device 110) at a first corresponding subsequent time point $T_{S1}'$ (e.g., the first corresponding subsequent time point $T_{S1}'$ may be approximately equal to or slightly later than the first subsequent time point $T_{S1}$), to allow the EP device to enter the normal operation state after completion of the first corresponding handshaking operation. During executing the wake-up procedure for the EP device to switch from the power saving state to the normal operation state for the second time, the clock request signal CLKREQ may switch from the non-request state to the request state at the third time point T3, and the reference clock signal REFCLK may switch from the invalid clock state to the valid clock state at the fourth time point T4, and more particularly, after the fourth time point T4 at which the reference clock signal REFCLK switches from the invalid clock state to the valid clock state, the EP device (e.g., the PCIe EP device 120) may start performing a second corresponding handshaking operation (e.g., the handshaking via the signal labeled "Tx (EP)" in the second round shown in FIG. 7, or the handshaking via the signal labeled "Tx (EP)" in the second round shown in FIG. 9) with the RC device (e.g., the PCIe RC device 110) at a second corresponding subsequent time point $T_{S2}'$ (e.g., the second corresponding subsequent time point $T_{S2}'$ may be approximately equal to or slightly later than the second subsequent time point $T_{S2}$), to allow the EP device to enter the normal operation state after completion of the second corresponding handshaking operation, where another third time period P3'(T2, $T_{S1}'$) between the second time point T2 and the first corresponding subsequent time point $T_{S1}'$ is different from another fourth time period P4'(T4, $T_{S2}'$) between the fourth time point T4 and the second corresponding subsequent time point $T_{S2}'$. Additionally, the self-training device such as the EP device (e.g., the PCIe EP device 120) may be arranged to adjust the peer-side common-mode restoration waiting time parameter $T_{CM\_RXDELAY}$ to make the other third time period P3'(T2, $T_{S1}'$) and the other fourth time period P4'(T4, $T_{S2}'$) be different from each other. For example, as a result of performing the self-training, the other fourth time period P4'(T4, $T_{S2}'$) is less than the other third time period P3'(T2, $T_{S1}'$), and therefore, the overall performance can be enhanced. For brevity, similar descriptions for these embodiments are not repeated in detail here.

According to some embodiments, for the self-training device such as the EP device (e.g., the PCIe EP device 120), the state transition procedure may be the sleep procedure, where the first state and the second state may represent the normal operation state (e.g. the L0 state) and the power saving state (e.g. the L1 state) of the EP device (e.g., the PCIe EP device 120), respectively, and in the sleep procedure, the EP device may switch from the normal operation state such as the L0 state to the power saving state such as the L1 state. During executing the sleep procedure for the EP device to switch from the normal operation state to the power saving state for the first time, the clock request signal CLKREQ may switch from the request state to the non-request state at the first time point T1, and the reference clock signal REFCLK may switch from the valid clock state to the invalid clock state at the second time point T2. During executing the sleep procedure for the EP device to switch from the normal operation state to the power saving state for the second time, the clock request signal CLKREQ may switch from the request state to the non-request state at the third time point T3, and the reference clock signal REFCLK may switch from the valid clock state to the invalid clock state at the fourth time point T4. For brevity, similar descriptions for these embodiments are not repeated in detail here.

According to some embodiments, the aforementioned at least one device among the RC device (e.g., the PCIe RC device 110) and the EP device (e.g., the PCIe EP device 120) may be arranged to adjust the aforementioned at least one predetermined parameter to at least make the first time period P1(T1, T2) and the second time period P2(T3, T4) be different from each other. For example, as a result of performing the self-training by the RC device (e.g., the PCIe RC device 110) and the EP device (e.g., the PCIe EP device 120), the second time period P2(T3, T4) is less than the first time period P1(T1, T2) and the other fourth time period P4'(T4, $T_{S2}'$) is less than the other third time period P3'(T2, $T_{S1}'$), and therefore, the overall performance can be enhanced. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adaptively adjusting state transition time in a PCIe system to enhance overall performance, the PCIe system comprising a root complex (RC) device and an endpoint device, the method comprising:
   toggling a clock request signal on a signal path coupled between the RC device and the endpoint device based on a request from the RC device or on a request from the endpoint device, wherein when the clock request signal toggles, the endpoint device transits from a first state to a second state; and
   toggling a reference clock signal from the RC device at a timing determined according to a training parameter among at least one predetermined parameter which is set dependent on at least one of the factors: a transition time, a restoration delay, a latency tolerance report (LTR) and a bias state, after the clock request signal toggles.

2. The method of claim 1, wherein regarding a wake-up procedure, the first state and the second state represent a power saving state and a normal operation state of the endpoint device, respectively.

3. The method of claim 2, wherein in the wake-up procedure, the endpoint device switches from the power saving state to the normal operation state through a recovery state.

4. The method of claim 2, wherein during executing the wake-up procedure for the endpoint device to switch from the power saving state to the normal operation state for a first time, the clock request signal switches from a non-request state to a request state at a first time point, and the reference clock signal switches from an invalid clock state to a valid clock state at a second time point; and during executing the wake-up procedure for the endpoint device to switch from the power saving state to the normal operation state for a second time, the clock request signal switches from the non-request state to the request state at a third time point, and the reference clock signal switches from the invalid clock state to the valid clock state at a fourth time point, wherein a first time period between the first time point and the second time point is different from a second time period between the third time point and the fourth time point.

5. The method of claim 4, further comprising:
   during executing the wake-up procedure for the endpoint device to switch from the power saving state to the normal operation state for the first time, after the second time point at which the reference clock signal switches from the invalid clock state to the valid clock state, starting performing a first handshaking operation between the RC device and the endpoint device at a first subsequent time point, to allow the endpoint device to enter the normal operation state after completion of the first handshaking operation; and during executing the wake-up procedure for the endpoint device to switch from the power saving state to the normal operation state for the second time, after the fourth time point at which the reference clock signal switches from the invalid clock state to the valid clock state, starting performing a second handshaking operation between the RC device and the endpoint device at a second subsequent time point, to allow the endpoint device to enter the normal operation state after completion of the second handshaking operation, wherein a third time period between the second time point and the first subsequent time point is different from a fourth time period between the fourth time point and the second subsequent time point.

6. The method of claim 5, wherein the RC device is arranged to adjust a common-mode restoration time parameter to make the third time period and the fourth time period be different from each other, wherein the common-mode restoration time parameter indicates time for the RC device to restore common-mode establishment.

7. The method of claim 5, wherein the endpoint device is arranged to adjust a peer-side common-mode restoration waiting time parameter to make the third time period and the fourth time period be different from each other, wherein the peer-side common-mode restoration waiting time parameter indicates wait time of waiting for the RC device to restore common-mode establishment.

8. The method of claim 4, wherein the RC device is arranged to adjust a reference clock on time parameter to make the first time period and the second time period be different from each other.

9. The method of claim 1, wherein regarding a sleep procedure, the first state and the second state represent a normal operation state and a power saving state of the endpoint device, respectively.

10. The method of claim 9, wherein during executing the sleep procedure for the endpoint device to switch from the normal operation state to the power saving state for a first time, the clock request signal switches from a request state to a non-request state at a first time point, and the reference clock signal switches from a valid clock state to an invalid clock state at a second time point; and during executing the sleep procedure for the endpoint device to switch from the normal operation state to the power saving state for a second time, the clock request signal switches from the request state to the non-request state at a third time point, and the reference clock signal switches from the valid clock state to the invalid clock state at a fourth time point, wherein a first time period between the first time point and the second time point is different from a second time period between the third time point and the fourth time point.

11. The method of claim 10, wherein the RC device is arranged to adjust a reference clock off time parameter to make the first time period and the second time period be different from each other.

12. The method of claim 1, wherein during executing a state transition procedure for the endpoint device to switch from the first state to the second state for a first time, the clock request signal transits at a first time point, and the reference clock signal transits at a second time point; during executing the state transition procedure for the endpoint device to switch from the first state to the second state for a second time, the clock request signal transits at a third time point, and the reference clock signal transits at a fourth time point; and at least one device among the RC device and the endpoint device is arranged to adjust the at least one predetermined parameter to at least make a first time period between the first time point and the second time point and a second time period between the third time point and the fourth time point be different from each other.

13. The method of claim 1, wherein at least one device among the RC device and the endpoint device is arranged to perform self-training on the at least one predetermined parameter to optimize state transition in the PCIe system, the self-training comprising:
determining whether at least one untrained state among a plurality of states of the endpoint device exists, wherein the plurality of states comprises the first state and the second state;
in response to existence of the at least one untrained state, determining whether at least one untrained parameter of a current state among the at least one predetermined parameter exists, wherein the current state is selected from the at least one untrained state;
in response to existence of the at least one untrained parameter, selecting a current untrained parameter from the at least one untrained parameter, and performing at least one training operation on the current untrained parameter to optimize a current transition time from an original state to a target state among the plurality of states, wherein the first state and the second state are selected as the original state and the target state during executing the state transition procedure, respectively; and
after performing the at least one training operation on the current untrained parameter, classifying the current untrained parameter to be a trained parameter.

14. The RC device that operates according to the method of claim 1.

15. The endpoint device that operates according to the method of claim 1.

* * * * *